US012521283B2

(12) United States Patent
Auer

(10) Patent No.: US 12,521,283 B2
(45) Date of Patent: Jan. 13, 2026

(54) DEVICE FOR FORMING AND/OR SMOOTHING A TAMPON END

(71) Applicant: Ruggli AG, Koblenz (CH)

(72) Inventor: Marco Auer, Leibstadt (CH)

(73) Assignee: Ruggli AG, Koblenz (CH)

( * ) Notice: Subject to any disclaimer, the term of this patent is extended or adjusted under 35 U.S.C. 154(b) by 0 days.

(21) Appl. No.: 18/858,399

(22) PCT Filed: Apr. 14, 2023

(86) PCT No.: PCT/EP2023/059854
§ 371 (c)(1),
(2) Date: Oct. 21, 2024

(87) PCT Pub. No.: WO2023/202958
PCT Pub. Date: Oct. 26, 2023

(65) Prior Publication Data
US 2025/0281336 A1 Sep. 11, 2025

(30) Foreign Application Priority Data

Apr. 22, 2022 (CH) .............................. 000474/2022

(51) Int. Cl.
*A61F 13/20* (2006.01)
(52) U.S. Cl.
CPC .............................. *A61F 13/2088* (2013.01)
(58) Field of Classification Search
CPC .............. A61F 13/2088; A61F 13/2091; A61F 13/2085; A61F 13/2082; A61F 13/2094
(Continued)

(56) References Cited

U.S. PATENT DOCUMENTS 2,416,706 A * 3/1947 McLaughlin ....... A61F 13/2085
28/118
2,601,633 A * 6/1952 Riordan ............. D06B 11/0093
427/256
(Continued)

FOREIGN PATENT DOCUMENTS

EP          0 822 795 B1      10/2000
WO       2019/186325 A1      10/2019
WO     WO-2021122467 A1 *    6/2021   ......... A61F 13/2082

OTHER PUBLICATIONS

International Search Report in PCT/EP2023/059854, mailed Jul. 5, 2023.

*Primary Examiner* — Amy Vanatta
(74) *Attorney, Agent, or Firm* — Collard & Roe, P.C.

(57) ABSTRACT

A device and a corresponding method for shaping and/or smoothing at least one end of a tampon blank, in particular an axial end of a tampon blank, includes a guide unit driven by at least one shaft. The guide unit includes first and second conveyor planes. The device also includes shaping sleeves on the second conveyor plane for receiving at least one respective tampon blank, and rotatable shaping caps on the first conveyor plane, each designed to be operatively connected to at least one end of a tampon blank in a shaping sleeve. The first conveyor plane and the second conveyor plane are designed in order to guide a respective at least one of the shaping sleeves on the second conveyor plane coaxially relative to at least one of the rotatable shaping caps on the first conveyor plane on the conveyor plane. A computer program product controls the device.

20 Claims, 8 Drawing Sheets

(58) Field of Classification Search
 USPC .......................................................... 28/118
 See application file for complete search history.

(56) References Cited

U.S. PATENT DOCUMENTS

| | | | | |
|---|---|---|---|---|
| 4,067,087 | A * | 1/1978 | Mast, Jr. ............. | A61F 13/2085 |
| | | | | 28/118 |
| 5,084,038 | A * | 1/1992 | Sheldon .............. | A61F 13/2082 |
| | | | | 156/193 |
| 5,909,884 | A * | 6/1999 | Schwankhart ...... | A61F 13/2082 |
| | | | | 28/118 |
| 2005/0022349 | A1* | 2/2005 | Pham ...................... | B29C 48/87 |
| | | | | 28/118 |
| 2013/0036584 | A1* | 2/2013 | Ishikawa ............. | A61F 13/2085 |
| | | | | 28/118 |
| 2017/0231831 | A1* | 8/2017 | Hilt ..................... | A61F 13/2054 |
| | | | | 264/259 |
| 2021/0077308 | A1* | 3/2021 | Schuler ............... | A61F 13/2082 |
| 2021/0093488 | A1* | 4/2021 | Brooks ............... | A61F 13/2088 |
| 2022/0280348 | A1* | 9/2022 | Heege ........................ | B06B 3/00 |

* cited by examiner

DEVICE FOR FORMING AND/OR SMOOTHING A TAMPON END

CROSS REFERENCE TO RELATED APPLICATIONS

This application is the National Stage of PCT/EP2023/059854 filed on Apr. 14, 2023, which claims priority under 35 U.S.C. § 119 of Swiss Application No. 000474/2022 filed on Apr. 22, 2022, the disclosure of which is incorporated by reference. The international application under PCT article 21(2) was not published in English.

The present invention relates to a device for forming and/or smoothing at least one end of a tampon or tampon blank, in particular an axial end of the stated tampon or tampon blank, and a corresponding method for forming and/or smoothing at least one end of a tampon blank, and a computer program product for controlling a device according to the invention, all according to the preambles of the characterizing claims.

TECHNOLOGICAL BACKGROUND

Tampons are used in medicine as well as for feminine hygiene with regard to menstruation, for example. The primary task of tampons in this use is, for example, to stop bleeding, or in the case of menstrual periods, to absorb the menstrual bleeding. For this purpose, tampons generally include at least one absorbent core made, for example, of a cellulose fiber fabric such as viscose. In some advanced or specialized models, the absorbent core made of fiber material is additionally enclosed by a nonwoven, which in particular embodiments may also extend into the absorbent body. This nonwoven may be manufactured from a thermoplastic polymer, for example, and often finds application where the smoothest possible appearance is desired, and the protrusion of individual fibers from the absorbent body is undesirable or even has an adverse effect on the actual function, for example because the product should under no circumstances leave behind fiber residues when removed from the body or the site of bleeding.

The tampons used for feminine hygiene are manufactured in a method in which essentially band-shaped cellulose strips are rolled up or folded and subsequently pressed into a tampon mold. This tampon mold generally comprises an essentially cylindrical base body, and has a distal end and a proximal end. The distal end is defined as the end opposite the user's hand, i.e., in the case of a tampon for feminine hygiene, the end that is inserted first. Correspondingly, the proximal end is considered to be the end closest to the hand being used. Tampons for feminine hygiene often additionally have structures on their cylindrical base body that are intended to facilitate the liquid transport into the interior of the absorbent body, and/or away from the distal end and to the proximal end.

In tampons for feminine hygiene, it is generally desirable to avoid hard edges. In particular, a tapering distal end, for example a hemispherical end or a conically tapering end, facilitates insertion of the tampon. The proximal end may have the same shape, but usually is not subject to the same requirements. In addition, in most fields of application and in particular in the area of feminine hygiene, the proximal must be able to accommodate a retrieval string that facilitates removal of the tampon from the body opening. As a result of the manufacturing process, which provides radial pressing of the strips for producing the cylindrical tampon, the lateral casing of the tampon is generally obtainable from the press with a satisfactory smoothness. However, there is a need to likewise process the axial ends, i.e., the distal and/or proximal end of a tampon, so that a surface of the tampon that is as smooth as possible is obtainable.

In the past, solutions have been presented in which a tampon blank for the processing has been stopped on a conveying device, and an operative connection with a processing tool has been established. This processing tool, which has been used in the Ruggli tampon manufacturing machines, among others, rotates about its longitudinal axis in one direction and thus processes the tampon blank with pressure, friction, and optionally with heating, thus effecting head smoothing. Smoothing via heat may take place similarly as with smoothing of clothing using an iron. In some rare cases, melting of the thermoplastic copolymer onto the distal tampon surface may also take place for the smoothing.

However, new tampon products provide, among other things, tampons made entirely of cotton. In addition, the higher cycle rates in tampon manufacture, which allow new solutions, such as disclosed in WO 2019/186325 A1, for example, are seldom operable using the older approaches.

Therefore, there is a need for devices for forming a tampon head, i.e., a distal and/or proximal end of a tampon, which meet these new requirements.

DESCRIPTION OF THE INVENTION

Thus, it is an object of the present invention to provide such a device, a method, and a computer program product for controlling a device according to the invention, which overcome at least one disadvantage of the known devices and methods.

Such a device, such a method, or a corresponding computer program product is preferably to be provided which is efficiently operable and which is able to provide formed and/or smoothed tampon heads having a consistently high quality. A further object of the present invention may be to provide a solution that may be used for this very purpose, regardless of the tampon material or a possible surface coating or characteristic of the tampon, and that is able to provide a consistently high quality of the stated tampon heads via slight adjustments of the process parameters.

At least one of these objects is achieved according to the characterizing portion of the independent claims.

One aspect of the present invention relates to a device for forming and/or smoothing at least one end of a tampon blank. In particular, the device is used for forming and/or smoothing an axial end of a tampon blank. The device according to the invention includes a guide unit that is driven by at least one axle. The guide unit includes a first conveying level and a second conveying level.

The device further includes a plurality of mold sleeves on the second conveying level for accommodating at least one tampon blank each. Furthermore, the device according to the invention includes at least one, in particular radially situated, rotatable mold cap that is designed to be brought into operative connection with at least one end of a tampon blank in a mold sleeve. The mold cap is also designed to effect forming and/or smoothing of at least one end of a tampon blank by exerting at least one of the following: contact pressure and/or heat and/or friction.

The first conveying level and the second conveying level are designed to each guide at least one of the plurality of mold sleeves on the second conveying level coaxially with respect to at least one of the plurality of rotatable mold caps on the first conveying level. The conveying levels are preferably situated in parallel to one another in such a way that the mold sleeves and mold caps are in each case concentrically situated over a total time period of the operative connection. Alternatively and/or additionally, the conveying levels are situated in parallel to one another in such a way that the mold sleeves and mold caps are in each case concentrically situated across a processing area of a conveying direction of the guide unit.

In one particular embodiment, the first conveying level and the second conveying level are situated in parallel to one another for at least the time period of the operative connection.

By use of the device according to the invention, it is possible to form ends of tampon blanks in this way, and to obtain a smooth tampon head in an efficient and scalable manufacturing process. The device according to the invention may, for example, be integrated into a continuous production line. Due to the drum that is situated so as to be rotatable about the central axle, the device according to the invention may be operated using, for example, a transfer wheel according to WO 2019/186325 A1, which allows a scalable continuous production line for the processes necessary for the tampon manufacture. One particular advantage of the radially rotatable mold cap situated at the drum is that the number of mold caps is adaptable. Thus, for example, very high production cycle times may be achieved. As a result of the mold cap being designed to effect at least one of the factors, contact pressure and/or heat and/or friction, for forming and/or smoothing at least one end of a tampon blank, the process may be adapted to different tampon materials. Thus, a person skilled in the art may decide, as a function of the material, size, and characteristics of the tampon, whether heating, for example, is necessary. This may be the case in particular when a thermoplastically meltable nonwoven is to be softened or slightly melted, or when a nonthermoplastic material is to be smoothed by heat in the manner of an iron. In other cases, a combination of friction and contact pressure may be suitable to achieve the desired smoothing.

In one particular embodiment, the guide unit is designed as a drum that is driven about a central axle, in particular as a drum that is driven about exactly one axle. This drum arrangement has the advantage that continuously circulating processing is possible, which is thus particularly gentle on materials, since no stops are required.

In one particular embodiment, the device is provided for forming an axial end of a tampon blank. Within the meaning of the present invention, the axial end may be one of the two ends of an essentially cylindrical tampon. For unidirectionally designed tampons, the direction of use results in a distal end facing the body and a proximal end facing the user. The device according to the invention is particularly preferably designed for forming the distal end, which in many preferred embodiments is a tapering end. Alternatively, however, the distal end may also be a flat end. The forming and/or smoothing would then correspondingly concern the flat end-face end, and an edge if necessary.

In one particular embodiment, the tampon blank is encased with a thermoplastic nonwoven at least at the axial end. It is likewise conceivable to use a purely organic tampon blank made of cotton fibers or hemp fibers, for example.

In one particular embodiment, the exertion of at least one of the factors, contact pressure and/or heat and/or friction, for forming and/or smoothing the end of the tampon blank is in each case a parameter that is individually settable in a predefined manner via the properties of the tampon blank, for example material characteristics.

In one particular embodiment, the first conveying level is designed as a first drum disk, and the second conveying level is designed as a second drum disk. The first and second drum disks are situated in parallel on the central axle, coaxially with respect to one another.

In one particular embodiment, the plurality of mold sleeves is radially situated on the second conveying level, in particular on the second drum disk (70).

In one particular embodiment, the first conveying level and the second conveying level are designed to each guide on the conveying level at least one of the plurality of mold sleeves (52) on the second conveying level (70) coaxially with respect to at least one of the plurality of rotatable mold caps (51) on the first conveying level (72) for a processing period, in particular at least a time period of the operative connection.

In an alternative embodiment, the plurality of mold sleeves on the second conveying level (70) is linearly situated. Analogously, the mold caps may also be linearly situated, at least for a time period of the operative connection, in order to guide the mold caps coaxially with respect to the mold sleeves.

In one particular embodiment, a plurality of rotatable mold caps that are radially situated at the drum is provided. The mold caps are particularly preferably synchronously rotatable. Within the meaning of the present invention, "synchronously rotatable" may be understood to mean that all mold caps are designed to perform an identical rotational movement about their longitudinal axes at the same time. The mold caps are particularly preferably situated in such a way that their longitudinal axes are situated radially on a drum disk and in parallel to one another. As an alternative to the synchronous rotatability of the mold caps, the mold caps may also be individually rotatable. Thus, the mold caps may be designed, for example, to rotate about their longitudinal axis at various rotational speeds. In this way, for example a graduated forming process in which friction for forming and/or smoothing the end of the tampon blank is variable may be controlled. The rotation may, for example, be accelerated from a low level to a higher level, and subsequently decelerated.

Within the meaning of the present invention, an "operative connection" may be understood to mean that the mold cap has physical contact with a tampon blank to be formed. Alternatively and/or additionally, an operative connection may already be present when the mold cap is able to exert a physical influence on the end to be formed, for example heating of same. Physical contact is preferably established between the mold cap and a tampon blank accommodated in the mold sleeve, the mold cap being able to exert at least one, in particular all three, factors, contact pressure and/or heat and/or friction, on this stated end.

In one particular embodiment, an operative connection is present over a time period while the tampon blanks are further conveyed on the conveying level. This has the advantage that processing and conveying do not have to be decoupled; i.e., the device according to the invention may be connected to a continuous production line.

In one particular embodiment, a plurality of mold caps is radially situated on a first drum disk.

In a further particular embodiment, a plurality of mold sleeves for accommodating at least one tampon blank each is situated on a second drum disk. The two drum disks are preferably situated in parallel to one another, so that a distance between the two drum disks, preferably situated coaxially with respect to one another, defines a processing space.

In one particular embodiment, the mold cap is designed in such a way that it may enter into operative connection with a tampon blank situated in a mold sleeve by bridging a distance in the processing space. For this purpose, the mold cap may be mounted, for example, at one end of a push rod that is translationally displaceable from the first drum disk to the second drum disk. The translational displaceability of the push rod may also serve to generate the parameter of contact pressure. In this embodiment, for example the first and second drum disks may be situated in parallel in such a way that a corresponding mold sleeve situated on a second drum disk is associated with a mold cap situated radially on the first drum disk, for example in that the mold cap and the corresponding mold sleeve are coaxially situated. A processing space situated in between may be bridged by the mold cap in order to enter into operative connection with the corresponding mold sleeve in such a way that a tampon blank contained in this mold sleeve may undergo forming and/or smoothing by the exertion of contact pressure and/or heat and/or friction.

In a further particular embodiment, the first drum disk and the second drum disk are driven by the central axle. A particular advantage of this arrangement is that the processing space may be additionally utilized for further processing steps. Thus, the processing space may be used as an engagement or as a disengagement in order to supply the tampon blanks to the device according to the invention, or, after processing is completed, to remove the tampon blanks from the device and supply them, for example, to packaging or to a further processing step. A further advantage of the embodiment according to the invention having two drum disks situated in parallel is the modularity of the facility. Via the selection of the drum disk diameter, it is possible not only to define certain parameters, for example a duration of processing, but also to adapt the batch sizes, i.e., the number of tampon blanks simultaneously processed, to the available space. By the use of flexible and dynamic removal options, as have been described above in the disclosure from WO 2019/186325 A1, the device according to the invention may be utilized to enable infinitely scalable production cycles with very high throughput rates.

A further advantage of the embodiment according to the invention having two drum disks situated in parallel is the fine adjustment of the parameters. Thus, the stated parameters of contact pressure and/or heat and/or friction may be individually set. The contact pressure is particularly preferably settable by overcoming a distance from the first drum disk to the second drum disk.

In a further preferred embodiment, the friction is settable via the rotatability of the mold cap.

In a further particular embodiment, the heat is settable via heating and/or friction of the mold cap. Alternatively or additionally, the mold sleeve may have a heatable design. This may be meaningful in particular when the tampon blank includes a material that is not suitable for being nonuniformly heated at various locations. Shear effects on the material, which affect the overall surface structure, may thus be prevented from occurring.

In one particular embodiment, the mold cap is designed to effect forming and/or smoothing of an end of a tampon blank by exerting contact pressure and heat and friction. The mold cap is particularly preferably situated at the end of a translationally displaceable push rod so that the mold cap is movable relative to a coaxially situated mold sleeve. Due to the translational movement of the push rod, the mold cap may exert contact pressure on a tampon blank that is accommodated in the mold sleeve.

It has surprisingly been shown that a combination of all three parameters, contact pressure and heat and friction, is able to effect a particularly smooth surface of a tampon at a tampon head.

In one particular embodiment, the at least one mold cap includes a hollow mold. This hollow mold corresponds essentially to the resulting shape of the end of the tampon blank to be formed. The hollow mold may define a conically tapering shape, for example. Alternatively, the hollow mold may define a hemisphere. In a further alternative, the hollow mold may define a flat end of a cylinder.

In practice, these shapes have proven to be particularly suitable for tampons for feminine hygiene. However, alternative configurations are also conceivable. Thus, the hollow mold may have geometric structures, for example, such as a protrusion which then results in an indentation at the corresponding tampon head. These specialized geometries may be implemented in the hollow mold of the mold cap, if necessary, by a person skilled in the art for certain applications or for medical tampons. One special advantage of the hemispherical hollow mold in the mold cap is the particularly low friction exerted by such a hollow mold when it is rotated under contact pressure against a tampon blank, in particular an axial end of a tampon blank.

In one particular embodiment, the mold cap is situated so as to be rotatable about its longitudinal axis.

In a further particular embodiment, the mold cap is also radially situated at the first drum disk in such a way that the mold cap is rotatable about the central axle of the drum.

In one particular embodiment, the mold cap has a defined roughness. The roughness is particularly preferably as low as possible. This may be achieved, for example, by using a highly polished stainless steel as the material for the mold cap.

In one particularly preferred embodiment, the mold cap has an exchangeable design. This may be achieved, for example, by the mold cap being mountable in a detachable connection with a drum disk or with a push rod, and being detachably fixable in a force-fit manner via a thread, for example. Via the selection of a certain mold cap, it is thus possible to select the requirements of the device and adapt them to the desired geometry of the tampon. In addition, the mold cap may be adapted, with regard to its roughness, to the material to be processed. A person skilled in the art may thus decide, for example, that [for] a tampon formed from pure cotton without a thermoplastic nonwoven coating, a mold cap with a different roughness is preferred; and another mold cap achieves ideal smoothness for a tampon that is coated with a thermoplastic nonwoven material.

In one particular embodiment, the at least one mold cap is arranged so that it is reversibly rotatable. The mold cap particularly preferably has a reversibly rotatable design such that it is able to undergo a rotation of between 0° to +/−360°, preferably up to +/−120°, particularly preferably +/−60°, and in particular at least +/−10°, about its longitudinal axis.

In one preferred embodiment, the mold cap has a reversibly rotatable design, so that it is able to undergo a rotation of essentially +/−20° about its longitudinal axis.

The mold cap is particularly preferably arranged in such a way that it is able to apply this reversing rotatability by mechanical means. Alternatively, the mold cap may be designed to be reversibly rotatable by electrical means.

Within the meaning of the present invention, "reversibly rotatable" may be understood to mean that a rotational movement is possible in both directions, for example in the clockwise and counterclockwise directions.

In one particular embodiment, the device according to the invention includes a centering aid for the mold cap and the corresponding mold sleeve. Thus, for example, a centering aid may be provided that enables optimal orientation and guidance when the mold cap enters into an operative connection with the mold sleeve. The centering aid is particularly preferably designed as a geometric shape at a mold sleeve and at a mold cap in each case. This geometric shape is particularly preferably a complementary shape, with the mold sleeve and the mold cap complementing one another. Thus, for example, the mold cap may be provided with a beveled contact surface, and the mold sleeve may be provided with a corresponding complementary beveled contact surface. During operation, a stroke would ensure that an operative connection of the mold cap with the mold sleeve is established, and the centering aid would ensure that the two elements are perfectly concentric with one another.

In one particular embodiment, the device includes a drive for the rotation, which drives the central axle of the rotatably situated drum.

In one particularly preferred embodiment, this drive is likewise designed to drive the rotation of the mold caps about their longitudinal axes.

In one particular embodiment, the least one rotatable mold cap which is radially situated at the drum is coupled to the drive. The mold cap is particularly preferably coupled to the drive via a cam disk, preferably in such a way that a rotation of the drum is coupled to a rotational movement of the mold cap. The rotation of the drum may effect a rotation of +/−20°, for example, of the mold cap about its longitudinal axis via a cam disk. This may be set via, among other things, the geometry of the cam disk. The cam disk particularly preferably has a guide which effects a rotation of the mold cap via a lever. This guide preferably extends radially with respect to the axis of the drum disk. A corresponding rotation about the longitudinal axis of the mold cap may be generated by varying the radius on the cam disk, using this guide. The rotatable mold caps particularly preferably have a decoupleable design. This has the advantage that in areas of the drum where other functions, for example loading and unloading of the drum, are carried out, a self-rotation of the mold caps may be prevented.

In one particular embodiment, a portion of the circumference of the drum disk is equipped with a cam disk that enables the decoupling of a mold cap. The decoupling may be enabled in particular in that an operative connection with a guide slot on the cam disk is establishable via a lever that extends radially from the mold cap, by means of a roller. If this lever is removed from the operative connection, for example by translationally retracting a push rod from a processing space, the mold cap is decoupled from the cam disk, and the self-rotation of the mold cap is adjusted. In contrast, if the mold cap is brought into operative connection with the mold sleeve, for example by a push rod with a mold cap at the end extending into the processing space and coming into physical contact with a tampon situated in a mold sleeve, the guide roller is transferred into the guide slot, and due to its movement along the guide slot undulatingly situated on the circumference of the drum disk, is transferred into a movement for rotation about the mold cap's own longitudinal axis.

As an alternative to the cam disk, the mold caps may also have an individually rotatable design. Thus, for example, it is conceivable to achieve magnetic rotatability of the mold caps by use of a rotor stator system. It would likewise be conceivable to drive the mold caps individually or synchronously by means of a toothed gear. The cam disk has the advantage that a single drive is required; namely, the drive of the axle of the drum and the drive for self-rotation of the mold caps may take place via this cam disk. Furthermore, the cam disk has the advantage that by adapting its geometry, i.e., changing the patch of the guide slot of the cam disk, it is possible to make a corresponding adaptation of the angle of the self-rotation of the mold caps.

In one particular embodiment, a mold cap has a heatable design. The mold cap particularly preferably has a heating element that is designed to heat the mold cap to a temperature of greater than 10°, in particular greater than 20°, more particularly between 20° and 180°, and particularly preferably between 20° and 120°.

In one particularly preferred embodiment, the mold cap is designed to be heated to 120°.

In a further particular embodiment, the mold cap is designed to be supplied with electrical energy via a sliding contact. The sliding contact is particularly preferably situated between the axle and the first drum disk.

In one particular embodiment, the mold sleeve includes a second push rod for outputting a formed or smoothed tampon. This push rod may be situated in such a way that it is able to translationally move along the longitudinal axis of the mold sleeve, thus bringing about ejection of a tampon.

In one particular embodiment, the drum according to the invention includes a first drum disk and a second drum disk. The two drum disks are situated in parallel and define a processing space therebetween. This processing space may be designed to allow an engagement that removes a finished tampon, i.e., a tampon with a smoothed head, from the drum. This engagement may, for example, be designed synchronously with respect to the drum in such a way that the engagement removes a tampon from the processing space between the two drum disks, while the tampon is ejected from the mold sleeve by means of an ejection pin.

In one particular embodiment, the push rod is designed to perform a stroke that allows the push rod to extend into the processing space in such a way that a mold cap, mounted at the end of the push rod, may enter into an operative connection with a mold sleeve situated concentrically with respect to same, and may initiate appropriate forming of a tampon blank situated therein. This process may be designed to begin at a certain section of the circumference of the drum disk and to end at a certain second of the drum disk, for example by the stroke reversing and the push rod being removed from the processing space.

In one particular embodiment, the operative connection between the mold cap and the cam disk may also be decoupled in this way. The section in which the push rods have established the stated operative connection may be referred to as a "processing section." The section in which the push rod is retracted, i.e., has left the processing space together with the mold cap, may be referred to as a loading and unloading section.

In one particular embodiment, the drum is designed in such a way that between one-fourth and two-thirds of the circumference of the drum is designed as a processing section. Approximately two-thirds of the drum are particularly preferably designed as a processing section. This means that a section of between three-fourths and one-third is designed essentially as a loading and unloading section.

In one particular embodiment, the device according to the invention also includes a thread shaft. The thread shaft is designed to securely stow a retrieval string during the processing. The thread shaft is preferably formed at the mold sleeve. The thread shaft may be designed, for example, as a shaft that extends in parallel to the mold sleeve lumen. This shaft particularly preferably ends in a suction opening through air may be drawn in through the shaft. Due to drawing in air, the retrieval string is securely retained in the thread shaft during the processing, and interference of the retrieval string with the forming process is thus largely excluded. A further advantage of the suction effect is that the device may be operated essentially free of dust. The suction device may be designed in such a way that it may simultaneously serve a plurality of thread shafts. During operation, while drawing in air, a tampon blank together with a retrieval string that protrudes at the proximal end would first be pushed at the proximal end into the mold sleeve, and the retrieval string would be pulled around a bend and into the thread shaft. The thread shaft serves to securely stow the retrieval string for the entire processing. When an ejection of the tampon takes place, the thread is simply pulled from the thread shaft and may be further processed. In addition, the tools for removing and/or equipping the device according to the invention are particularly preferably equipped with corresponding thread securing elements, for example thread shafts and suction openings.

In one particular embodiment, a plurality of mold sleeves and a plurality of rotatable mold caps are provided. The number of mold sleeves preferably corresponds to the number of mold caps, and these are concentrically arranged in each case on two oppositely situated, parallel drum disks.

In one particular embodiment, the device includes between 6 and 28, in particular between 6 and 18, more particularly between 8 and 16 mold caps. A corresponding second drum disk may have the analogous number of mold sleeves.

A further aspect of the present invention relates to a method for forming and/or smoothing at least one end of a tampon blank, preferably an axial end.

In one particular embodiment, the method according to the invention includes provision of a device as described above. The present invention is further defined in the following discussion, based on specific method steps. For a person skilled in the art, it is naturally understood that further structural features of the device according to the invention may be derived from the method features. Likewise, corresponding method steps may be derivable from the structural design of the device according to the invention as described above.

The method according to the invention provides for equipping a mold sleeve with a tampon blank. This equipping may be carried out, for example, by means of a lever that engages with a processing space. This lever may be designed, for example, to have a coaxial orientation with respect to a mold sleeve, as described above, for a certain time period, and to utilize this time period, by means of a translationally displaceable push rod, in order to equip the mold sleeve with a tampon blank. The method according to the invention further provides for contacting the tampon blank with a mold cap which in particular is radially situated at a drum. This takes place in such a way that at least one end of the tampon blank in the mold sleeve is acted on by at least one of the following: contact pressure and/or heat and/or friction.

The method according to the invention further provides the step of processing the tampon blank during a time period of the operative connection on a conveying path of the conveying unit, in particular on a drum circulating path. This processing may take place using the stated parameters, for example, in that a mold cap that has established operative connection carries out, for example, a rotation about its longitudinal axis in order to exert friction on the head of the tampon blank, or in that the mold cap is able to exert a contact pressure, for example via a translational push rod that is designed to perform a stroke on the stated tampon head. In addition, the mold cap may have a heatable design in order to act on the head of the tampon blank via the stated heat as processing.

This processing is carried out in particular during the course of the rotation of a drum about a central axle, or the conveying on a conveying level. This processing particularly preferably takes place over an angular range of this rotation, for example over an angular range of between 0° and 270°, preferably between 0° and 180°, more preferably between 0° and 90°. Within the meaning of the present invention, 0° is defined as the point in time in which a mold cap enters into an operative connection with a tampon blank situated in a mold sleeve, and processing begins, using at least one of the three stated parameters, heat and/or contact pressure and/or friction. The axial end of the tampon blank is particularly preferably acted on simultaneously by all three parameters over the entire processing.

In one particular embodiment, the friction is generated essentially by a reversing rotation of the mold cap. The mold cap particularly preferably has a defined, low roughness. The reversing rotation may take place, for example, in an angular range of +/−10° to 30°, particularly preferably +/−20°.

The reversing rotation is particularly preferably coupled to the drive of the drum, in particular coupled to the drive of the drum via a cam disk.

In one particularly preferred embodiment, the reversing rotation is coupled to the drive of the drum via a cam disk during the processing, and is discontinued during loading and/or unloading by decoupling from the cam disk.

In a further particular embodiment of the method according to the invention, the mold cap is designed to enter into operative connection with the tampon blank, mounted in a mold sleeve, via a stroke.

Via this stroke, a mold cap is also particularly preferably coupled to the cam disk in such a way that a rotation of the drum disk on which the mold cap is situated triggers a self-rotation of the mold cap via the cam disk.

A further aspect of the present invention relates to a computer program product for controlling a device mentioned above, in particular for carrying out the described method using the above-mentioned device. The computer program provides that the parameters selected from the group comprising contact pressure, heat, and friction for forming and smoothing the at least one end of a tampon blank are individually presettable. This individual presettability may take place as a function of the materials used or the geometric properties of the tampon blank. One particular advantage of the present invention is that the processing may take place via the controlling of a drive, namely, a central drive of the axle of the drum. A further method parameter that is settable in a defined manner is the heat, which may be supplied to the mold cap via a slip ring, for example, as the electrical contact. Self-rotation of the mold cap, which defines the corresponding friction, may be controlled via the geometry of the cam disk.

The present invention provides a device, a method, and a corresponding computer program product for controlling the stated device and for carrying out a method according to the invention, which have a high level of adaptability. By use of the stated device, it is possible not only to achieve a particularly high cycle rate, for example by carrying out continuous processing, but also to process numerous various tampon shapes and geometries and to ensure a consistently high quality of smoothing of a tampon head.

The present invention is now explained in greater detail below, with reference to specific exemplary embodiments and figures, but without being limited thereto. A person skilled in the art may also infer further advantageous embodiments from this detailed description.

DESCRIPTION OF THE FIGURES

Exemplary embodiments of the invention are described with reference to the following figures. For the sake of simplicity, identical components are provided with the same reference symbols in the present figures.

The figures schematically show:

FIG. 1b shows a detailed view of a section from FIG. 1a.

DETAILED DESCRIPTION OF THE INVENTION

The device described with reference to the following figures is particularly suited for forming head ends of tampons for feminine hygiene, which are made up essentially of a folded or rolled fiber material as an absorbent body, for example viscose cellulose fibers, and a thermoplastic nonwoven casing that is closed off toward the outside. However, the shown device is equally suited for purely organic tampons, for example those made of cotton fibers or hemp fibers.

The device shown by way of example is arranged as a drum, and has two drum disks situated in parallel which define a processing space. The drum arrangement is particularly suitable for integrating the device according to the invention into a production line having a plurality of processing steps.

Figure 1A:
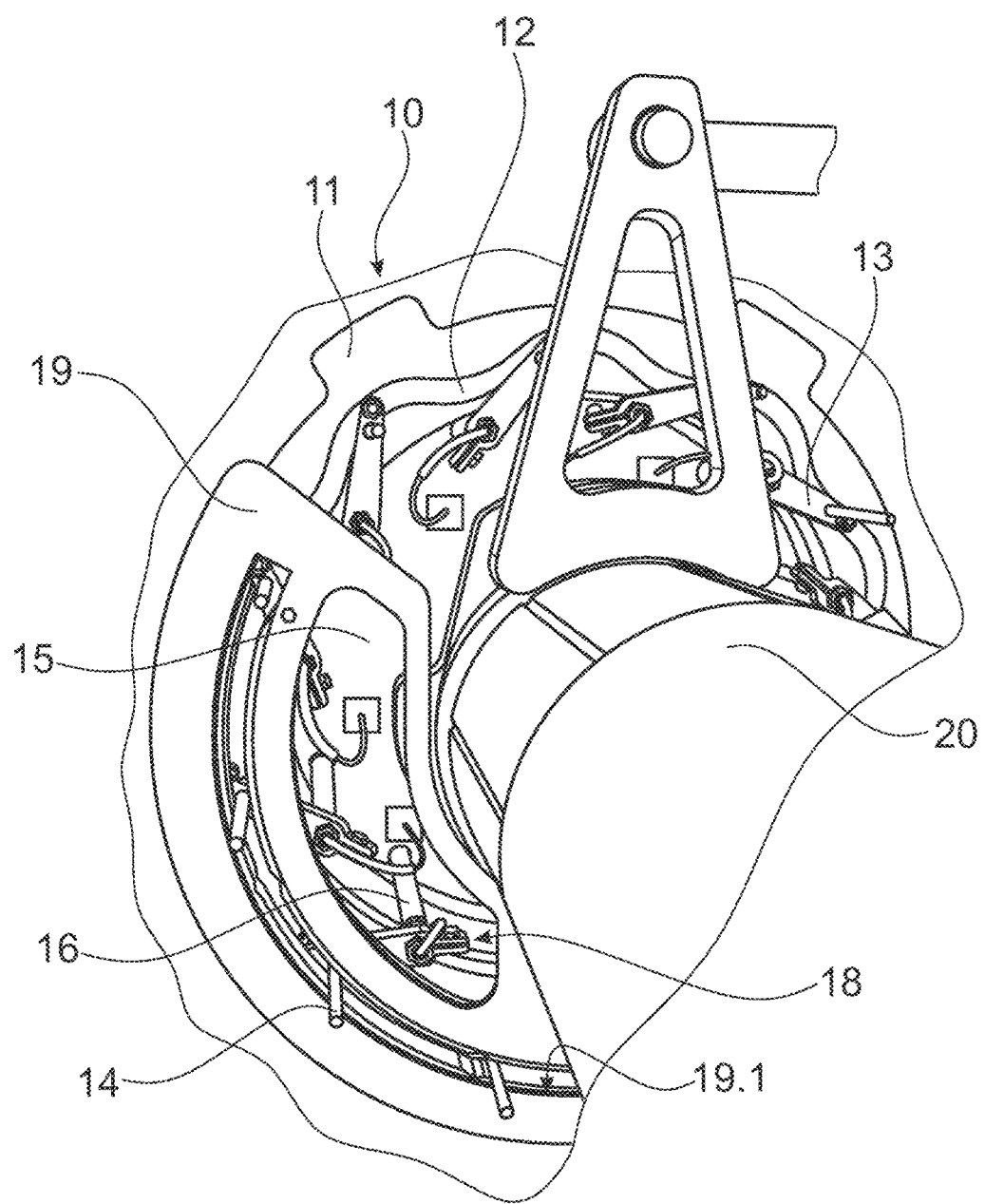
FIG. 1a shows a mold cap guide of a first drum disk.

FIG. 1a shows a mold cap guide of a first drum disk. Essentially, a view from the longitudinal axis of a drive shaft of a drum 10 is shown.

The drum 10 includes a first drum disk (at the rear of the image, in the extension of the drive axle). This first drum disk is driven by a drive 20. A plurality of push rods 16 are situated on the first drum disk 15. These push rods 16 rotate due to the rotation of the first drum disk about the axis of the drive 20. The push rods 16 have a first configuration and a second configuration. They are designed to perform a stroke that is able to transfer the push rods from the first configuration into the second configuration, and back. The push rods are also coupleable to a cam disk 11 via a lever 13.

In the first configuration, the push rods are decoupled from the cam disk. In this first configuration, as is apparent from the subsequent figures, the device according to the invention may be loaded with tampon blanks and the smoothed tampons may be unloaded.

The swivel levers 13 have a guide pin 14 which is situated in parallel to the longitudinal axis of the push rod 16, at the end of the swivel lever 13, and which in the first configuration engages with a guide 19.1 of a guide plate 19. This may, for example, prevent the swivel lever 13 from swiveling in the first configuration. The guide 19.1 extends (not visible in FIG. 1a) over the angular range of the drum according to the invention in which loading and unloading [are carried out]. In contrast, a further angular range is defined via a cam disk 11 that is rigidly connected to a machine frame. When the push rod is in the second configuration, an operative connection with a cam disk slot 12 of the cam disk 11 is established via the swivel lever 13. The swivel lever 13 thus generates a rotational movement of the push rod 16. This rotational movement is driven by the central drive 20 via the cam disk 11. The push rod 16 is supported via a bearing 18 so as to be swivelable with respect to the swivel lever 13.

Electrical energy is supplied to the drum disk via a sliding contact (not shown), and in turn supplies the push rods 16 with power via cables 21 and [provides] heating of a mold cap (not shown, since it is situated behind the plane of the drawing and the first drum disk 11).

The cam disk 11 is preferably [made] of a material having a low coefficient of friction. The cam disk preferably has an exchangeable design. Particularly preferably provided at the end of the swivel lever 13 is a bearing via which the swivel lever 13 may enter into operative connection with the cam disk 11, more precisely, with the cam disk slot 12. A bearing roller 17 is particularly preferably provided.

During operation, the push rods 16 on the one hand rotate radially about the central axle 20 of the drum, in that they are rotated about the axis on a circulation path on the drum disk 15, and on the other hand rotate about their own longitudinal axis over an angular range, namely, when the swivel lever 13 engages with the cam disk 11 via the corresponding roller 17 and carries out a swivel movement due to the geometric profile of the cam disk slot 12, resulting in a self-rotation of the push rod 16 in a certain angular range. This angular range is a function of the geometry of the cam disk and of the cam disk slot 12. In the exemplary embodiment shown, the length of the swivel lever 13, the "amplitude" of the cam disk slot 12, is selected in such a way that swiveling of the swivel lever 13 results in a rotation of the push rod of +20° to −20°. An overall rotational movement of 40° is thus carried out, although in the reversing direction. Due to the reversibly rotatable push rods, the corresponding rotation is transferred from the mold cap to the tampon blank to be formed, which surprisingly has shown that particularly smooth tampon heads are producible in this way.

Figure 1B:
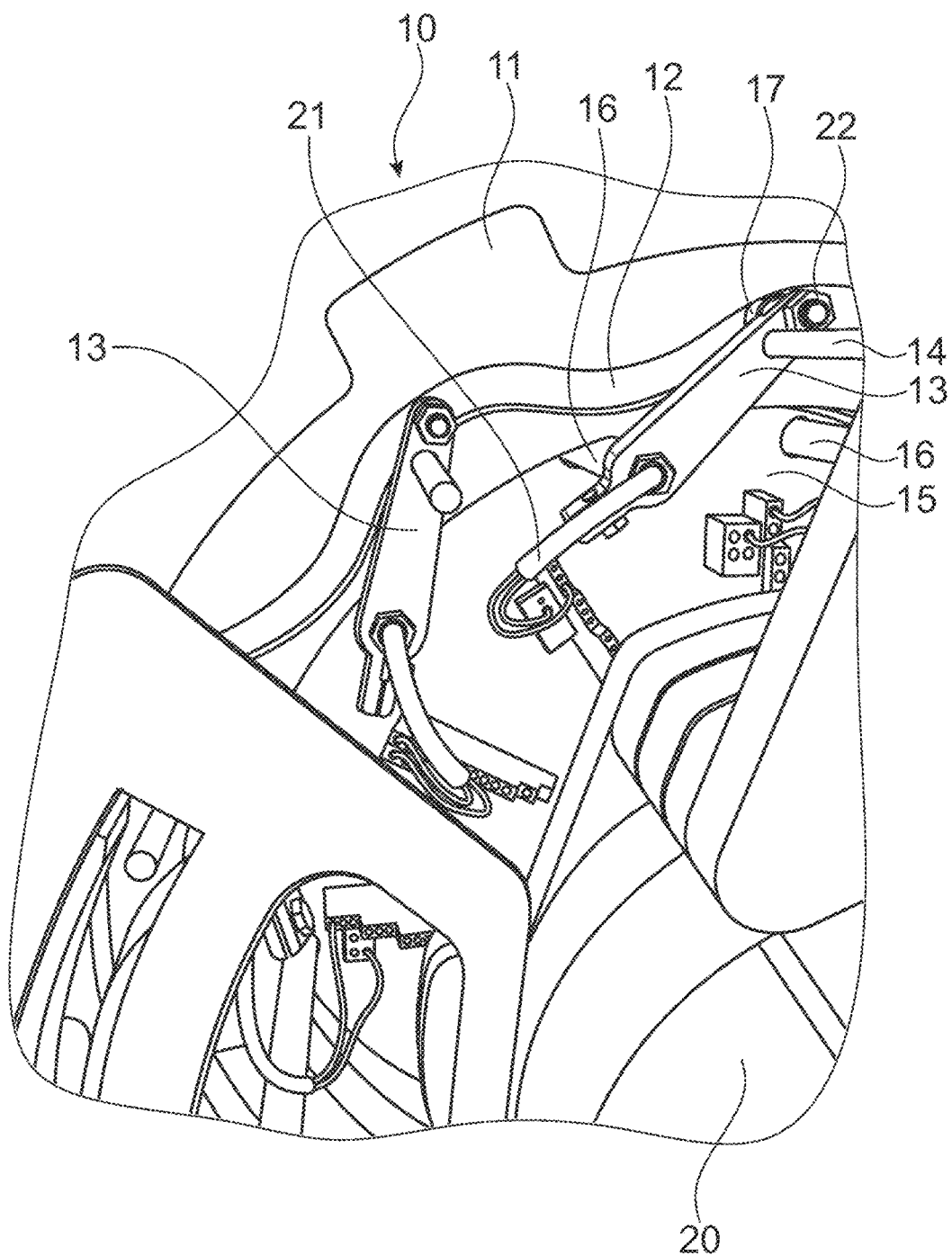

FIG. 1b schematically shows a detailed view of a section from FIG. 1a. The area shown is a detail from the processing area.

The push rod 16 has performed a stroke movement that extends through the first drum disk 15 and brings a guide roller 17 into operative connection with a cam disk slot 12. Due to the selected cam disk slot 12, an up-and-down movement of the swivel lever 13 is transferred to the push rod 16 as a reversing rotation. The guide roller 17 is connected to the swivel lever 13 via a bearing having a nut 22. Duration rotation of the drive 20, a rotation is thus transferred to the push rod 16 via the cam disk 11. The drum disk 15 is supplied with energy via a slip ring, and a cable guide 21 supplies the push rod with electrical energy for heating a mold cap (not visible in in FIG. 1b).

Figure 2A:
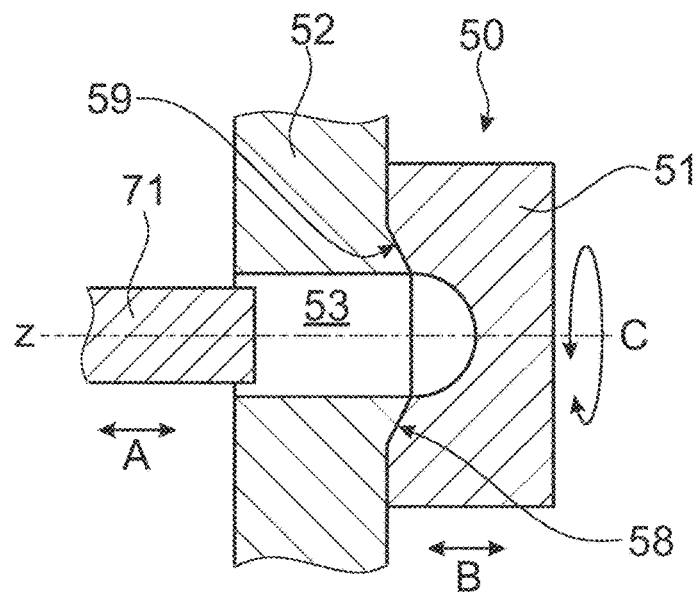
FIG. 2a shows a forming unit.
Figure 2B:
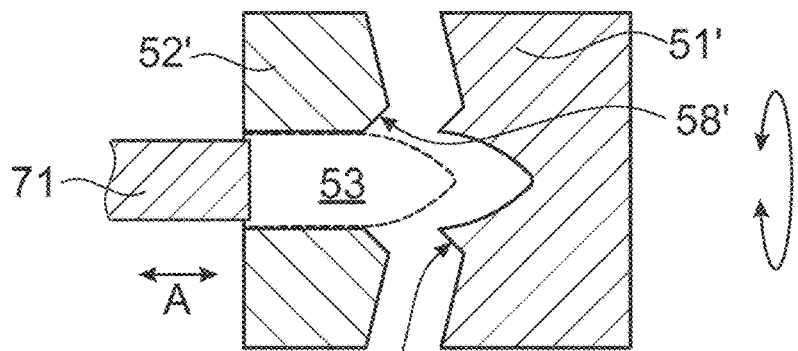
FIG. 2b shows an alternative forming unit.
Figure 2C:
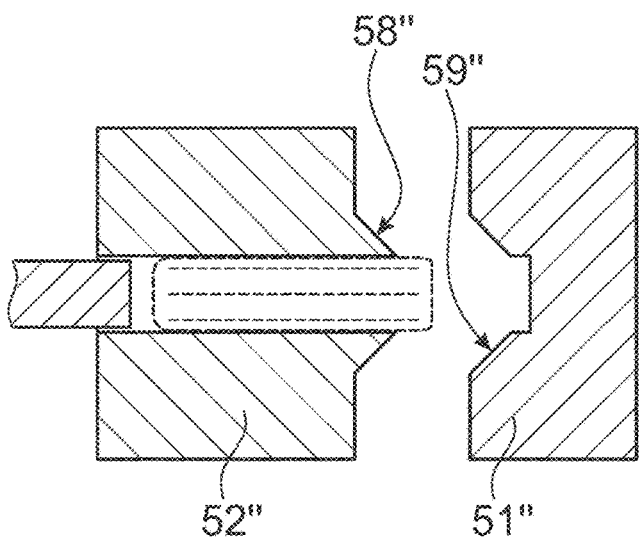
FIG. 2c shows a further alternative forming unit.

FIGS. 2a through 2c schematically show various embodiments of a forming unit, and also illustrate how the operative connection is established.

FIG. 2a shows a forming unit 50 according to the invention with an operative connection that has taken place. The forming unit 50 includes a rotatable, in particular reversibly rotatable, mold cap 51. The forming unit also includes a mold sleeve 52 that is designed to accommodate a tampon blank, to be formed, in a forming space 53.

An ejection pin 71 that is translationally displaceable in the longitudinal direction is used to empty the mold sleeve 52 and to discharge a tampon blank from the forming space into a processing space. The mold cap 51 shown here has been brought into the stated operative connection, for example via a translational movement that has taken place essentially coaxially with respect to the longitudinal axis Z. The mold cap 5 shown is likewise rotated in a rotational direction C, namely, rotated reversibly by +20° to −20°, via a push rod that has carried out the stated translational movement.

The translational movement is effected by a push rod stroke B of a push rod 16, to the end-face end of which the mold cap 51 is fastened. This push rod 16 also transfers the rotational movement, which may be effected by a cam disk, for example, and which is coupled to the drive of a drum or a guide unit, to the mold cap 51. The mold cap 51 rotates reversibly C, i.e., in both directions, that is, in the clockwise direction and in the counterclockwise direction, about the longitudinal axis of the push rod or of the mold cap 51, and thus produces smoothing of a tampon blank inserted in the forming space 53.

In the example shown in FIG. 2a, the forming space 53 and the corresponding geometry of the mold cap 51 are designed to produce an essentially semicircular tampon head. Removal of the tampon blank is facilitated by an ejection stroke A of the ejection pin 71, the ejection stroke A pushing the tampon out of the sleeve 52 into a processing space (not shown in FIG. 2a) after the mold cap 51 has released the operative connection.

The forming unit 50 has a centering aid in order to optimally establish the operative connection. In the present example of FIG. 2a, this centering aid is implemented in each case by a sleeve contact surface 58 that is formed at the mold sleeve 52, and a corresponding precisely fitting cap contact surface 59 that is formed at the mold cap 51. These contact surfaces 58, 59 extend over the entire circumference of the sleeve 52 or of the mold cap 51, and thus facilitate precise positioning of the tool, i.e., the mold cap 51, on the mold sleeve 52, and thus define the exact processing space.

As previously mentioned, the forming space 53 may be adapted to various tampon geometries. Thus, for example, the diameter of the forming space 53, its longitudinal extension, or also its opening toward the mold cap may be adapted to the corresponding tampon geometries. This may also be achieved by a person skilled in the art by exchanging a corresponding set made up of the mold sleeve 52 and the mold cap 51. Similarly, the forming unit 50 according to the invention is a separately marketable unit, which for the device according to the invention allows a high level of adaptability to specific tampon parameters and which may thus be adapted to the specific customer needs.

This is illustrated by way of example in FIG. 2b, which shows a forming unit 50 according to the invention that is designed to satisfy an alternative tampon geometry. In the present example, a tampon with a conically tapering tampon head is formed. FIG. 2b likewise illustrates an alternative embodiment of the centering aid. In FIG. 2b, an adapted mold sleeve 52' is provided with a contact surface 58' that extends around the circumference of the outlet opening of the forming space 53. The mold cap 51' has a corresponding counterstructure, in the form of a cap contact surface 59', which extends around the mold, which itself has a conically tapering blind hole opening. During operation, the two contact surfaces are contacted by a push rod stroke, and the forming unit is thus closed and the two elements, the mold cap 51' and the mold sleeve 52', are brought into operative connection.

Figure 3A:
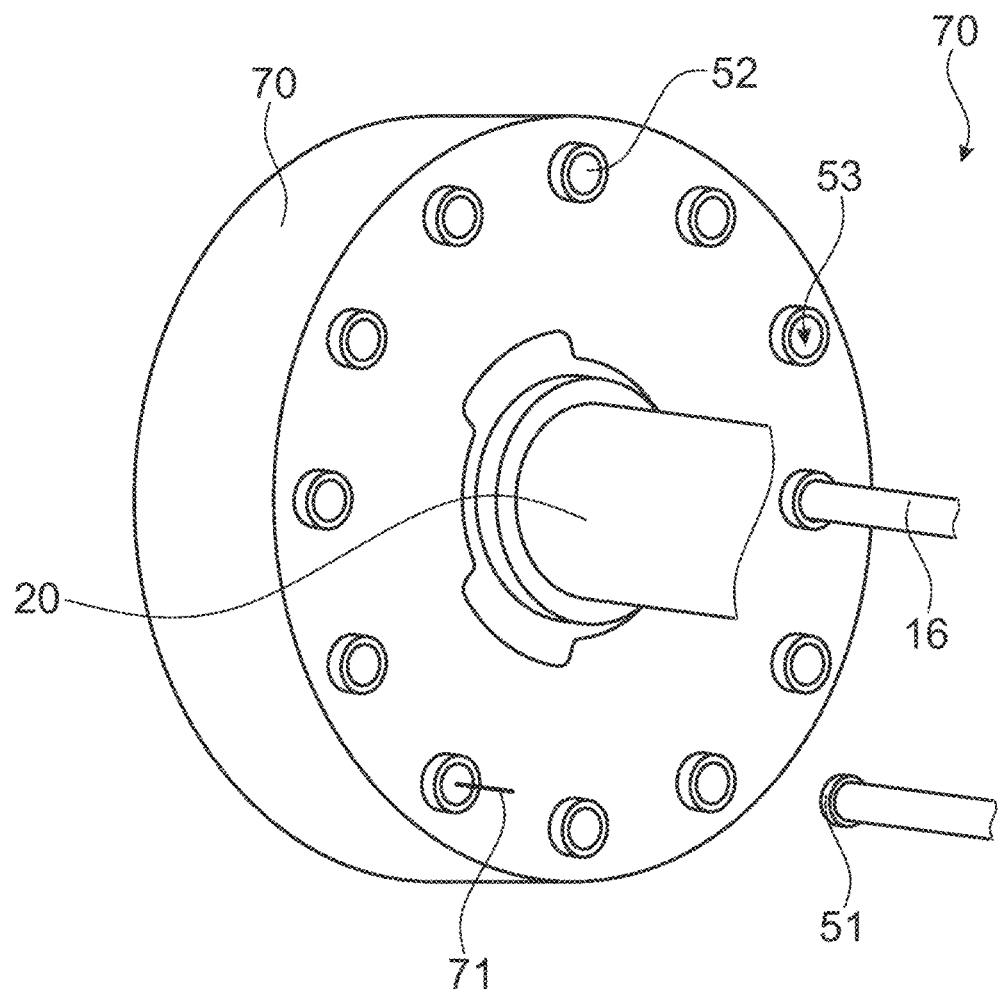
FIG. 3a shows a second drum disk.

A further example of a forming unit according to the invention is shown in FIG. 2c, where an appropriately geometrically adapted mold sleeve 52' may be brought into operative connection with a correspondingly adapted mold cap 51". In this example as well, the sleeve contact surface 58" and the mold cap contact surface 59" are complementary to one another and serve to perfectly center the two tools. This particular forming unit is used to produce a tampon having an essentially flat tampon head. The person skilled in the art obtains numerous suggestions from these examples to transfer and adapt the concept according to the invention to further specific tampon geometries. FIG. 3a shows a second drum disk of a device according to the invention. A second drum disk 70 includes a plurality of mold sleeves 52, each mold sleeve 52 being suitable for accommodating a tampon/tampon blank. The mold sleeve has a corresponding forming space 53 for this purpose.

The second drum disk 70 shown may be rotated about a central rotational axis via a drive 20. In the process, the mold sleeves 52 move on a circulation path. This circulation path is set in such a way that the mold sleeves 52 are each coaxially situated with respect to push rods 16, which are aligned on a first drum disk (not shown in FIG. 3a) and which via a stroke may extend into a processing space, so that a mold cap 51 at the end of the push rod 16 may enter into operative connection with a tampon in a forming space 53 in such a way that friction via a rotation of the mold cap 51, contact pressure via the push rod 16, and heat via heating of the mold cap 51 may be applied to the tampon blank.

Figure 3B:
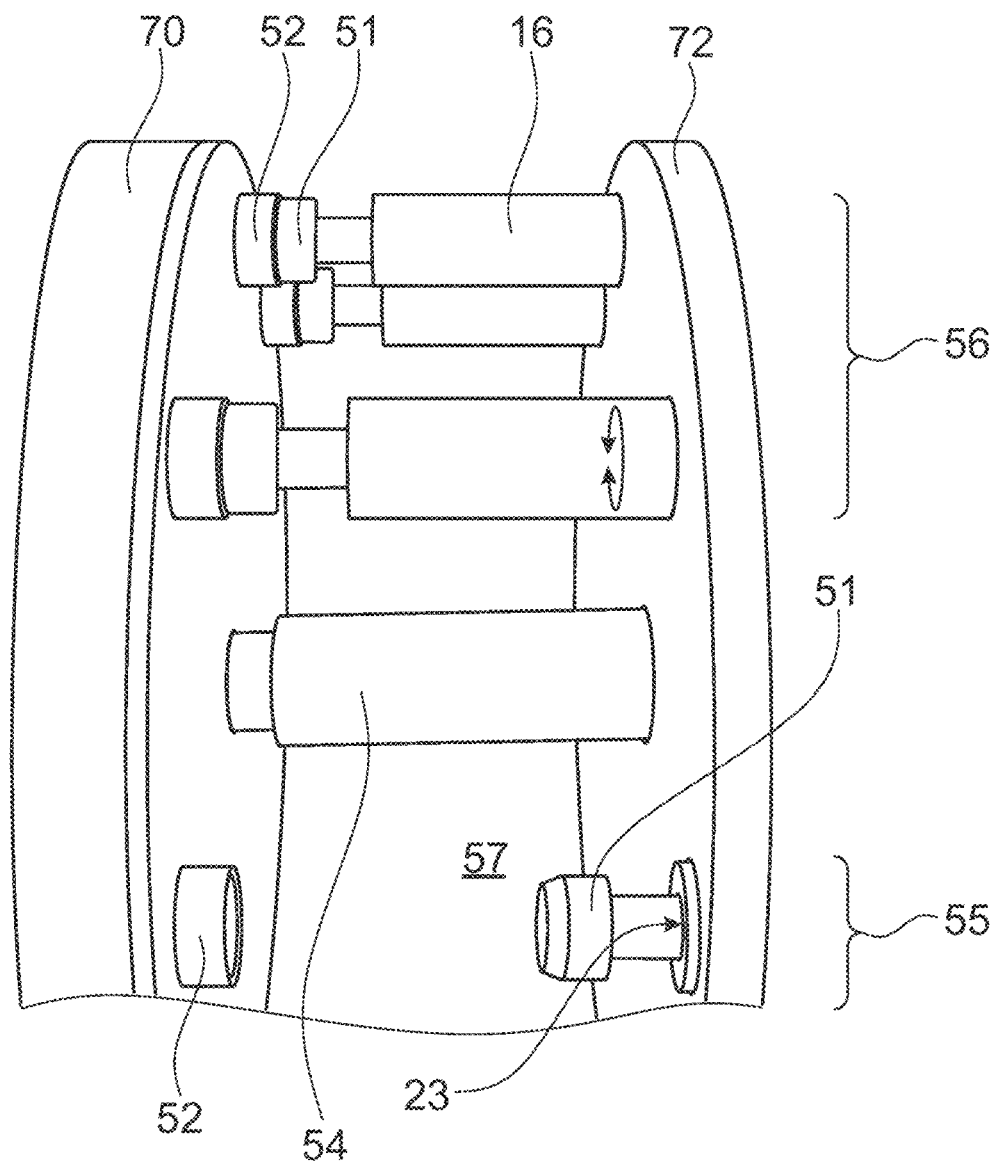
FIG. 3b shows a first drum disk and a second drum disk.

FIG. 3b shows a schematic view of the two drum disks 70, 72 of a drum 10 according to the invention 10. FIG. 3b shows the second drum disk 70 described from FIG. 3a, which includes a series of mold sleeves 52.

A series of recesses 23 is formed on a first drum disk 72, through which a plurality of push rods 16 may likewise extend, coaxially with respect to the mold sleeves 52, into a processing space 57. The push rods move past this processing space 57 upon performance of a stroke movement, which is reversible, and represent a transition from a processing state to a loading and unloading state of the drum according to the invention.

When the mold caps 51, which are provided at the ends of the push rods 16, have moved past the processing space 57, they enter into operative connection with tampons contained in the mold sleeves 52. A rotation about the respective longitudinal axes of the push rods 16 is transferred to the mold caps 51.

This self-rotation in an angular range between +20° and −20° is made possible by means of a cam disk that is fed by the same drive that drives the rotation of the two drum disks 70, 72. The two parallel drum disks 70, 72 rotate in such a way that the mold sleeves and the mold caps are always situated coaxially with respect to one another. Upon completion of the stroke movement, the push rods 16 move from a first configuration 55 into a second configuration 56. The first configuration 55, as stated, is used for loading and/or unloading of the drum. The second configuration 56 is the configuration in which the processing of the tampon blanks takes place, i.e., contact pressure, heat, and friction are applied in each case to the tampon.

Figure 4A:
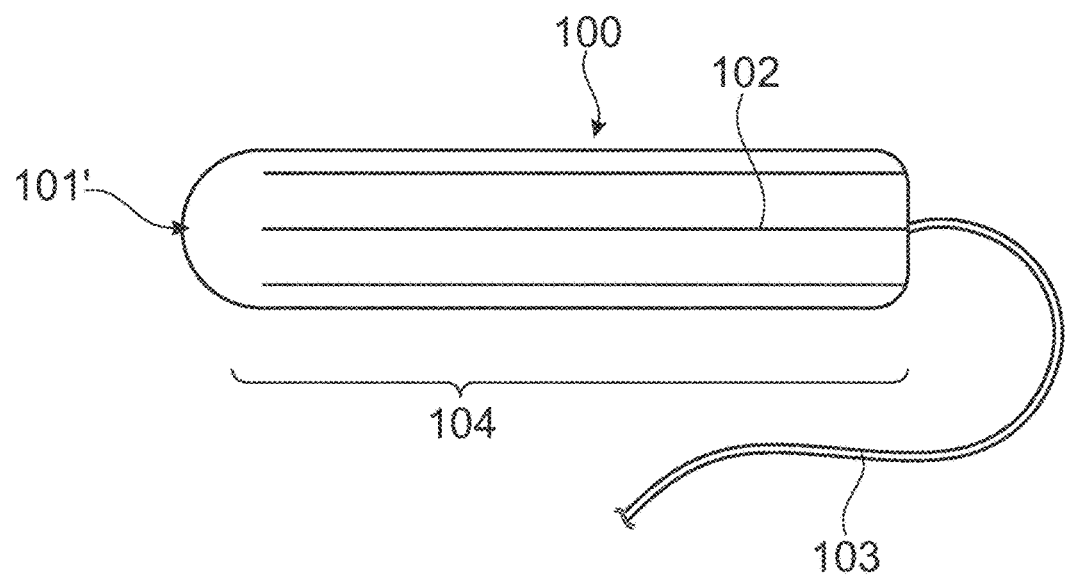
FIG. 4a shows a formed tampon with a hemispherical head.

By use of the device according to the invention, tampons according to FIG. 4a may be produced which, among other things, have a smoothed, conically tapering tampon head 101'. In the present example, the produced tampons 100 have grooves 102 extending in parallel to the longitudinal axis, and a tampon body 104 that is designed to accommodate liquid. A retrieval string extends from the tampon at the proximal end.

Figure 4B:
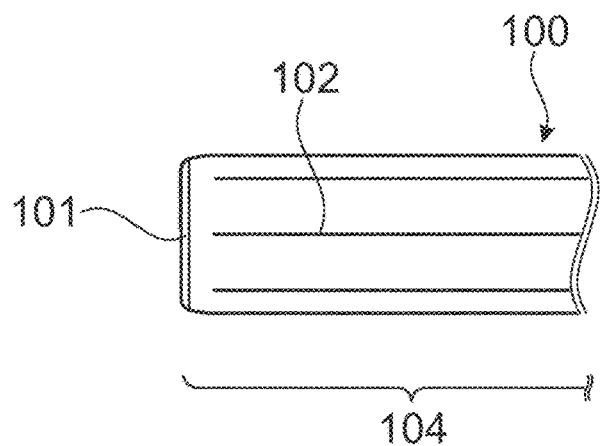
FIG. 4b shows a formed tampon with a flat head.
Figure 4C:
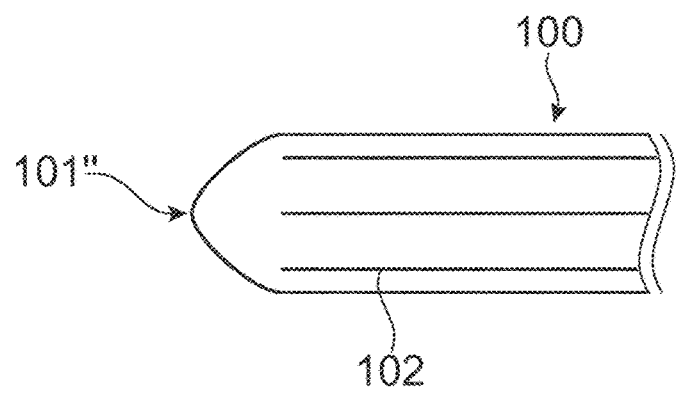
FIG. 4c shows a formed tampon with a conical head.

FIG. 4b shows an example of a tampon having a flatly shaped tampon head 101. The edges are beveled. FIG. 4c shows an example of a tampon having a conically tapering tampon head 101.

This tampon is likewise smoothable by use of the device according to the invention and the method according to the invention, for example via the specific embodiment of the mold cap used, as illustrated by way of example in FIGS. 2a through 2c.

Figure 5:
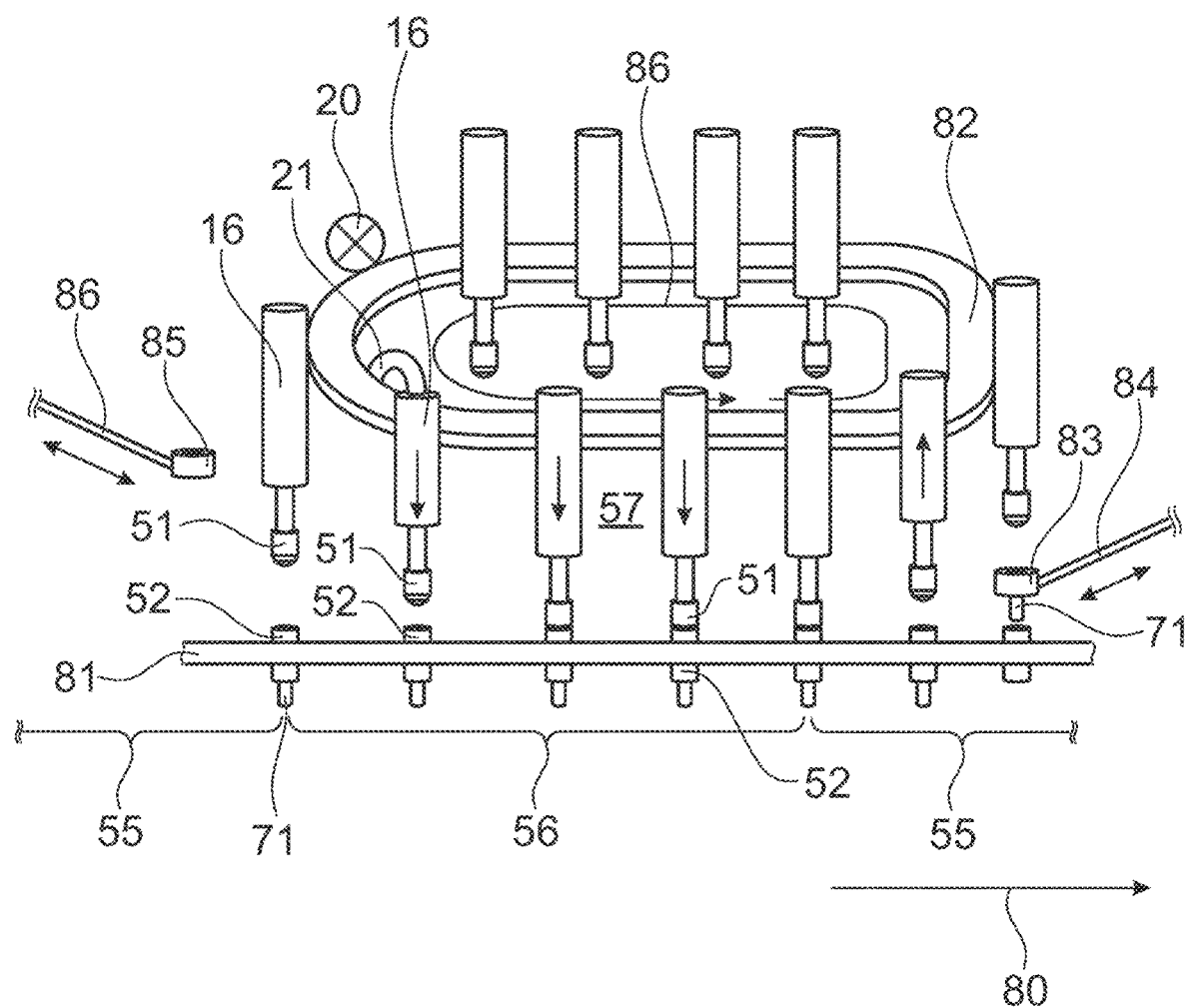
FIG. 5 shows the device with a linear guide unit.

FIG. 5 shows an embodiment of the device according to the invention that is an alternative to the drum embodiment described above. The device shown is used to form and/or smooth at least one axial end of a tampon blank. In this device the tampon blanks are conveyed in an essentially linear conveying direction 80 while being processed. The tampon blanks (not shown) are fed into the device by means of a placement lever 86, at the end-face end of which a placement engagement element 85 is formed; specifically, a tampon blank is introduced into a mold sleeve 52.

This mold sleeve 52 is rigidly connected to a second conveying level 81, for example in that this second conveying level 81 has a recess into which the mold sleeve 52 may be connected to the second conveying level 81 in a precisely fitting and form-fit manner. The second conveying level 81 may be designed as a belt, for example a conveyor belt. A person skilled in the art is familiar with numerous ways in which such a conveyor belt may be designed; for example, it may be an elastic belt driven by rollers, although approaches using toothed chain links are also conceivable, as known in various forms from conveying technology. Alternatively, the mold sleeve may be guided in a track or slot in the second conveying level, and a carrier or carrier system is used to convey the mold sleeves in the conveying direction. In the case of a belt, for the second conveying level 81 this belt may have a circulating design, for example, so that essentially a carrier function is implemented by the belt for the mold sleeves 52.

The mold sleeves 52 include an ejection pin that serves to eject the formed tampons from the device after processing is completed. The mold sleeves 52 are provided with a cavity which is designed to accommodate the tampon blank, and which is further designed to enter into operative connection with a mold cap 51.

The mold cap 51 is fastened to the end of a push rod 16, which is situated on a second conveying level 82 via a carousel. The mold sleeve 52 and the mold cap 51 are designed in such a way that they are each concentrically aligned with one another essentially for the time period of processing, i.e., whenever an operative connection becomes established and/or is established. Overall, the conveying of the tampon blanks and tampons on the device according to the invention shown by way of example may be differentiated into two configurations. In a first configuration 55, the tools are not operatively connected and also not concentrically aligned with one another. In this configuration of the first configuration 55, the device according to the invention may be equipped. Likewise in this newly assumed first configuration 55, after processing has taken place, a removal engagement element 83 may engage with a processing space 57, the removal engagement element 83 carrying out a movement into this processing space 57 via a removal lever 84 and removing a completely formed tampon, the ejection pin 71 carrying out the ejection from the mold sleeve 52 and pushing this tampon into the removal engagement element 83, where it may be supplied to further processing.

The processing space 57 is defined as the space between the two tools, the mold cap 51 and the mold sleeve 52, and is the space that must be bridged when the mold caps 51 are brought into operative connection with the mold sleeves 52 by means of a stroke of the push rods 16. In the example shown, mold sleeves 52 and mold caps 51 are also concentrically aligned with one another in this processing space 57. As described above, these mold sleeves and mold caps may each be equipped with centering aids, as illustrated in FIGS. 2a through 2c, for example.

The first conveying level 82 is designed as a carousel, and after the operative connection has been released, guides the tools back into the starting position. The first conveying level 82 may be driven by means of a drive, and a corresponding cam disk, for example at the profile of the first conveying level 82, may be used to effect the stroke of the push rods 16. When this stroke has been completely performed, the tools pass into a second configuration 56. Over the time period in which the tools are in the second configuration 56, by means of a rotation of the mold caps 51 about their longitudinal axis, by means of contact pressure by the stroke of the push rod 16, and by means of thermal heating, at least one of the elements of pressure, friction, and/or heat may be applied to the tampon blanks so that they undergo a forming process. To apply heat to the tampon blanks, in the present example a cable 21 is provided which is able to conduct electrical energy into the mold cap 51 for heating.

One particular advantage of the device shown is that the entire device may be driven with a single drive and with corresponding cam disks or transmission wheels. The tools are designed in each case to be synchronously aligned concentrically with one another. A particular further advantage is the processing period in which the tampon blanks may be processed, and at the same time further moved over a section of the conveying direction 80. Continuous forming of tampon blanks into formed tampons is thus ensured.

Figure 6A:
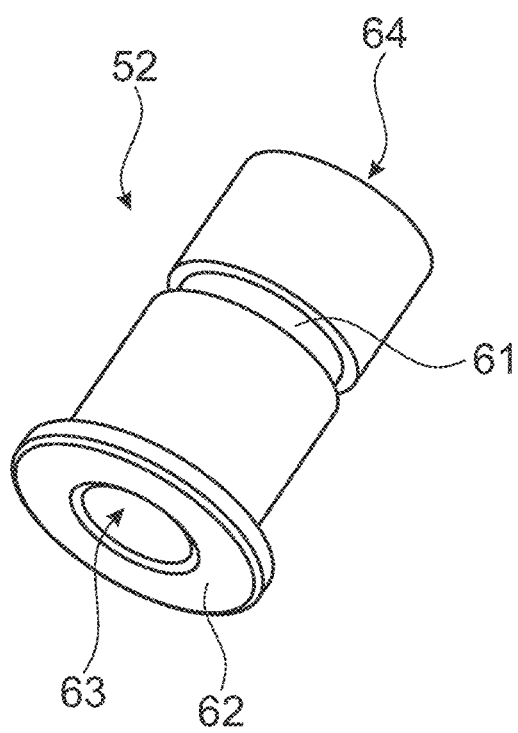
FIG. 6a shows a mold sleeve.

The present invention also allows adaptations to be made to specific needs regarding the tampon geometries. FIG. 6a illustrates an example of a mold sleeve 52 according to the invention. The mold sleeve 52 has an essentially cylindrical base body into which a mold sleeve slot 61 is embedded. The mold sleeve slot may be used to lock the mold sleeve in a corresponding recess of a conveying level. The mold sleeve slot prevents the mold sleeve from falling out during operation, and by use of a bayonet-type closure mechanism, for example, may enable a form-fit connection. The mold sleeve 52 has an equipping opening 64 through which a tampon blank may be introduced into the mold sleeve 52. Situated at the opposite end is a sleeve recess 63, through which an ejection pin (not shown in FIG. 6a) may reach into the mold sleeve and eject a tampon.

A sleeve flange 62 secures the mold sleeve 52 with respect to the conveying level in question, such as a drum disk, for example.

Figure 6B:
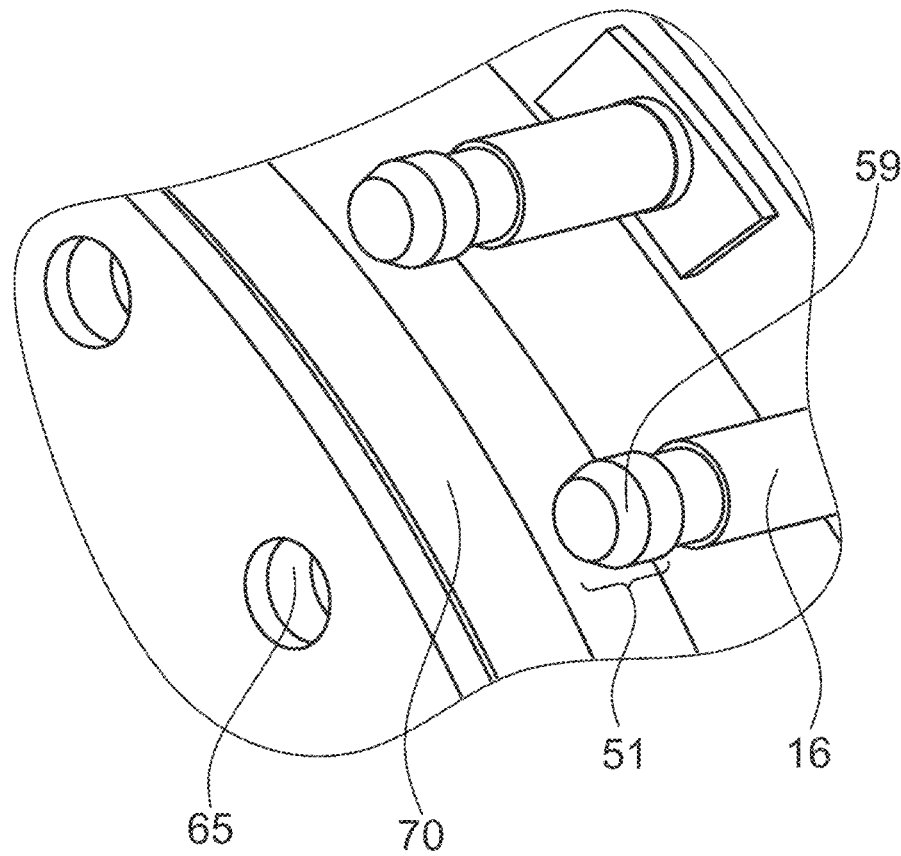
FIG. 6b shows a second drum disk.

This is illustrated in FIG. 6b, where a drum disk 70 is designed with a mold sleeve receptacle 65 that is suitable for accommodating a mold sleeve 52 as shown in FIG. 6a. The drum disk 70 is oriented in parallel to a further drum disk, which, concentrically with respect to the mold sleeve receptacle 65, includes tools in the form of push rods 16, at the end piece of which a mold cap 51 is situated. The mold cap 51 has a suitable, complementary cap contact surface 59 which serves as a centering aid for the mold sleeve 52.

Exchanging the mold cap and the mold sleeve is possible with a few steps, which allows a high level of adaptability of the device according to the invention to various tampon geometries. The specifically matching contact surfaces also ensure that the tools are correctly installed in each case, i.e., that appropriate mold caps are paired with matching mold sleeves.

By use of the present invention, a device and a method as well as a corresponding computer program product are provided which are able to easily and efficiently produce smooth tampon heads on tampon blanks.

LIST OF REFERENCE SYMBOLS 10 drum
11 cam disk
12 cam disk slot
13 swivel lever
14 guide pin
15 first drum disk
16 push rod
17 guide roller
18 bearing
19 guide plate
19.1 guide
20 drive
21 cable
22 nut
23 recess
50 forming unit
51, 51', 51" mold cap
52, 52', 52" mold sleeve
53 forming space
54 axle
55 first configuration
56 second configuration
57 processing space
58, 58', 58" sleeve contact surface
59, 59', 59" cap contact surface
61 mold sleeve slot
62 sleeve flange
63 sleeve recess
64 equipping opening
65 mold sleeve receptacle
70 second drum disk
71 ejection pin
72 first drum disk
80 conveying direction
81 second conveying level
82 first conveying level
83 removal engagement element
84 removal lever
85 placement engagement element
86 placement lever
100 tampon
101 tampon head, flat
101 tampon head, hemispherical
101" tampon head, conical
102 grooves
103 retrieval string
104 tampon body A ejection stroke
B push rod stroke
C reversible rotation
Z longitudinal axis

The invention claimed is:

1. A device for forming and/or smoothing at least one end of a tampon blank, including:
   a) a guide unit that is driven by at least one axle, and the guide unit including a first conveying level and a second conveying level;
   b) a plurality of mold sleeves on the second conveying level for accommodating at least one tampon blank each;
   c) a plurality of rotatable mold caps on the first conveying level, each of which is designed to be brought into operative connection with at least one end of a tampon blank in a mold sleeve, and the mold cap being designed to effect forming and smoothing of at least one end of a tampon blank by exerting at least one of the following: contact pressure and/or heat and/or friction, and wherein
   the first conveying level and the second conveying level are designed to each guide on the conveying level at least one of the plurality of mold sleeves on the second conveying level coaxially with respect to at least one of the plurality of rotatable mold caps on the first conveying level and wherein
   the guide unit is designed as a drum that is driven about a central axle.

2. The device according to claim 1, wherein the guide unit is designed as a drum that is driven about exactly one axle.

3. The device according to claim 2, wherein the first conveying level is designed as a first drum disk and the second conveying level is designed as a second drum disk, and the first and second drum disks are situated in parallel on the central axle, coaxially with respect to one another.

4. The device according to claim 1, wherein the plurality of mold sleeves is radially situated on the second conveying level.

5. The device according to claim 1, wherein the first conveying level and the second conveying level are designed to each guide on the conveying level at least one of the plurality of mold sleeves on the second conveying level coaxially with respect to at least one rotatable mold cap of the plurality of rotatable mold caps on the first conveying level for a processing period.

6. The device according to claim 1, wherein the plurality of mold sleeves on the second conveying level is linearly situated.

7. The device according to claim 5, wherein the at least one rotatable mold cap includes a hollow mold that corresponds essentially to the resulting shape of an end of the tampon.

8. The device according to claim 5, wherein the at least one rotatable mold cap has a defined roughness.

9. The device according to claim 5, wherein the at least one rotatable mold cap has a reversibly rotatable design.

10. The device according to claim 2, wherein the device includes a drive for rotating the drum about the central axle.

11. The device according to claim 2, wherein at least one rotatable mold cap of the plurality of rotatable mold caps is situated at the drum and coupled to the least one axle as a drive, in such a way that a rotation of the drum is coupled to a rotational movement of the rotatable mold cap.

12. The device according to claim 1, wherein at least one rotatable mold cap of the plurality of rotatable mold caps has a heatable design.

13. The device according to claim 2, wherein the drum has between six and eighteen mold caps.

14. The device according to claim 9, wherein the at least one rotatable mold cap is formed at an end-face end of a push rod that is designed to perform a stroke.

15. A method for forming at least one end of a tampon blank, including the steps:
   a) providing the device according to claim 1;
   b) equipping a mold sleeve with a tampon blank;
   c) contacting the tampon blank with a mold cap situated at a first conveying level, so that at least one end of the tampon blank in the mold sleeve is acted on by at least one of the following: contact pressure and/or heat and/or friction, and
   d) processing the tampon blank during a time period of the operative connection on a conveying path of a conveying unit.

16. The method according to claim 15, wherein the tampon blank is acted on by contact pressure and heat and friction for the processing.

17. The method according to claim 16, wherein the friction is generated by a reversing rotation of the mold cap.

18. The method according to claim 17, wherein the reversing rotation is coupled to a drive of a drum via a cam disk.

19. The method according to claim 15, wherein the tampon blank is acted on by a temperature of greater than 10° C., and/or is acted on by friction via a rotation of the mold cap by between +20 degrees and −20 degrees.

20. A computer program product stored on a non-transitory medium for controlling the device according to claim 1, wherein the parameters selected from the group consisting of contact pressure, heat, and friction for forming and smoothing the at least one end of a tampon blank are individually presettable.

* * * * *